2,949,435

METHOD FOR THE PREPARATION OF ACRYLONITRILE GRAFT COPOLYMER FIBER-FORMING SYSTEMS

Clyde W. Davis, Antioch, John F. Voeks, Concord, and Forrest A. Ehlers, Walnut Creek, Calif., assignors to The Dow Chemical Company, Midland, Mich., a corporation of Delaware No Drawing. Filed Mar. 5, 1956, Ser. No. 569,266

2 Claims. (Cl. 260—45.5)

This invention relates to a method for the preparation of improved fiber-forming systems comprising polymeric substances and aqueous, polyacrylonitrile-solvent, saline solutions and to the compositions which thereby may be obtained.

Diversiform techniques are available for enhancing various properties, particularly the dye-receptivity, of fibers and related shaped articles including filaments, strands, yarns, tows, threads, cords and other funicular structures, ribbons, tapes, films, foils, sheets and the like which are manufactured from synthetically prepared polymeric substances. In order to avoid tautologism and for purposes of convenient illustration, the invention will hereinafter be immanently described in particular association with fibers although it is equally adaptable to any of the shaped articles related thereto. According to several frequently-employed conventional practices for improving fiber properties, calculated incorporations of functional ingredients or additaments in fiber-forming compositions may impart specific desired characteristics in varying degrees to the fiber which may be obtained from the composition. Such ingredients may be in the form of monomeric materials, having the desired functional utility, which are interpolymerized with other monomeric materials, having superior fiber-forming characteristics, to form conventional extrudable copolymeric substances. The conventional copolymeric substances obtained in this manner have substantially homogeneous molecular structures in which the different interpolymerized monomeric materials are arranged in a more random and statistical manner of distribution in the copolymer molecule. Alternatively, the ingredients may be in the form of polymeric or other substances employed for their beneficial effect in extrudable mixtures or blends with other polymeric substances which may have superior or more desirable fiber-forming characteristics.

In either instance, difficulties may frequently be encountered. Thus the incorporated ingredient may have inferior fiber-forming characteristics and may even spoliate the superior fiber-forming properties of the composition. Such quid pro quo is often evident in fibers manufactured from copolymeric substances or from blended polymeric substances in which a particular characteristic such as dye-receptivity has been augmented at the expense of other valuable and desirable intrinsic properties, such as melting point, tensile strength or the like. In addition, especially when mixed or blended polymeric substances are involved, it is often awkward and arduous to properly incorporate a desired ingredient in the fiber-forming composition, particularly if it is insoluble in the composition; or to obtain uniform and stable distribution of the ingredients throughout the composition or the fiber product which may be obtained therefrom; or to permanently retain the ingredients in the fiber product manufactured from the composition. The last mentioned effect may particularly be involved when the functional ingredients are susceptible to being leached or otherwise removed from the fiber during its processing or other subsequent usage.

Many of the difficulties attendant the incorporation of functional ingredients in fiber-forming compositions may frequently be precluded by employing spinnable graft or block copolymers. These may advantageously be prepared by polymerizing a desired fiber-forming monomeric material in the presence of a preformed polymeric material having a desirable functional utility, such as superior dye-receptivity. The resultant graft copolymers can not be separated into their constituent parts by physical methods. They may be further characterized as having a substantially heterogeneous molecular structure in which a non-statistical distribution of the interpolymerized materials is obtained due to the arrangement of chemically linked chains of different polymeric materials. Graft copolymers, as in the case of other polymeric substances, are ordinarily separately prepared before being utilized in fiber-forming compositions.

In particular, therefore, this invention relates to a method for the preparation of improved fiber-forming systems comprising polymeric substances, including graft copolymers, and aqueous, polyacrylonitrile-solvent, saline solutions and to the compositions which thereby may be obtained. It has more specific reference to the preparation of such systems with acrylonitrile and like monoethylenically unsaturated monomeric materials.

It is among the principal objects of the present invention to provide a more expedient and simplified method for the preparation of fiber-forming systems comprised of grafted or block copolymeric substances.

It is an additional object to provide a method wherein the grafted copolymeric substance may be obtained directly in the fiber-forming system.

A further object of the invention is to provide fiber-forming compositions which are benefited by the incorporation of functional ingredients having specific desired effects in articles prepared from such compositions without sacrificing or substantially diminishing other valuable intrinsic characteristics and properties in structures and articles which may be cast, extruded or otherwise shaped or formed from such compositions.

A related object is to permit the employment and incorporation of graft copolymer-containing polymeric substances in fiber-forming systems in a manner which hitherto has neither been known nor comprehended and which is impossible to facsimile and to provide graft copolymer-containing compositions which may not be obtained or achieved by the application of known or suggested techniques and practices.

Additional objects and advantages will be apparent throughout the description and specification which follows.

According to the present invention, improved fiber-forming systems may be obtained by dissolving acrylonitrile or a mixture of acrylonitrile and another monoethylenically unsaturated monomeric material in an aqueous, polyacrylonitrile-solvent, saline solution; then dissolving in the solution which is formed a polymeric material having a desired functional utility, such as dye-receptivity, which is soluble in the solution of the monomeric material in the aqueous saline solvent; and then polymerizing the dissolved monomeric material in the presence of the dissolved polymeric material to form a fiber-forming, graft copolymer-containing polymeric substance in spinnable dispersion in said aqueous, polyacrylonitrile-solvent, saline solution. The compositions which may thus be obtained are comprised of polymers and copolymers of the monoethylenically unsaturated monomeric material and graft copolymers of the monoethylenically unsaturated monomeric material with the functional polymeric material which are dispersed, and frequently may be dissolved, in a spinnable, fiber-forming condition in the aqueous, polyacrylonitrile-solvent, saline solution. The compositions thus obtained may advantageously be spun or extruded directly as they are prepared, generally in a manner pursuant to conventional wet-spinning techniques, or they may otherwise be cast or formed directly into fibers and other shaped structures and articles having substantially undiminished properties and characteristics which have been enhanced and improved by the incorporation of the functional polymeric substance. Further, the functional ingredient which is contained in fibers and the like prepared from such compositions is more permanently incorporated and retained in the fiber product throughout its processing and treatment and other subsequent applications, even when it is of a particularly soluble or otherwise easily extractable nature.

The compositions which may be obtained by practice of the invention and which are herein referred to as graft copolymer-containing compositions are readily distinguishable by their different properties from known compositions, among which are polymer blends, even though a similarity in their empirical chemical composition may be involved.

Preferably, as mentioned, the monoethylenically unsaturated monomeric material which is employed for forming the graft copolymer is acrylonitrile. As indicated, mixtures of desired monomeric substances which are soluble in aqueous, polyacrylonitrile-solvent, saline solutions, particularly mixtures containing predominant proportions of acrylonitrile, may also be employed in order to form copolymeric substances along with the graft copolymer. Preferably, a sufficiency of acrylonitrile is employed to insure that the resulting polymerized substance, including the graft copolymer which is formed, contains at least about 80 percent by weight of acrylonitrile polymerized in the polymerized substance product. Other monomeric materials which may be employed advantageously with acrylonitrile in the practice of the present invention include allyl alcohols, vinyl acetate, methacrylamide, methyl acrylate, 2-vinyl pyridine, dimethylaminoethylacrylate, methacrylonitrile, acrylic acid, itaconic acid, vinyl acetic acid, ethyl acrylate, fumaronitrile, 2-vinyl 5-ethyl pyridine, ethylene sulfonic acid and its alkali metal salts, allyl sulfonic acid and its alkali metal salts, and the like.

A variety of polymeric materials having a desired functional utility may be employed in the practice of the present invention. The functional polymeric materials may be utilized to enhance any desired property or characteristic which they are capable of improving in the fiber product including visco-elastic properties, antistatic and hydrophilic properties and dyeing properties. It is usually, however, of greatest benefit and practical significance to select functional polymeric materials which have the ability to improve the dyeability or dye-receptivity of the synthetic, fiber-forming, polymeric substance or to augment these characteristics in order, for example, to secure an improvement in dye penetration throughout the product. The functional polymeric material which is involved may have a relatively low or high molecular weight depending upon the nature of the material and its functional capabilities and characteristics as may be present at particular molecular weight values or degrees of polymerization and as may vary with changes in the molecular weight of the same functional polymeric material.

As has been indicated, the functional polymeric material must be capable of being dissolved in the solution which is formed of the monoethylenically unsaturated monomeric material in the aqueous, polyacrylonitrile-solvent, saline solution in order to form an efficient polymerization system for preparation of the graft copolymer. However, it may also be directly soluble in the aqueous saline solvent. In such instances the functional polymeric material may, if desired, be directly dissolved in the aqueous saline solvent before incorporation of the monomeric material in the polymerization system.

Great advantage may be derived, particularly with respect to improved dyeability of the fiber product, when polyvinylpyrrolidone or a copolymer of vinylpyrrolidone is employed as the functional polymeric material. Other polymeric materials which may be employed include polymers or copolymers with other monomers such as acrylonitrile of vinyl alcohol, vinyl lactams such as vinyl caprolactam and vinyl piperidone, vinyl pyridine, vinyl acetate, vinylbenzene sulfonic acid and its salts, acrylamide, vinylbenzyl-trimethyl ammonium chloride, vinylmethyl ether, N-acryloyl taurine and its salts, 2-aminoethyl-methacrylate hydrochloride, 2-sulfoethylacrylate, X-sulfopropylacrylate (wherein the symbol "X" indicates that the exact position of the sulfo group in the propyl chain is unknown), maleic anhydride, ethylene sulfonic acid and the like. If it is desired, a mixture of different functional polymeric substances may be utilized in the practice of the invention in order to achieve specific effects. It should be noted that all of the above indicated functional polymeric materials are polymers of monoethylenically unsaturated monomers.

It is ordinarily advantageous to employ sufficient quantities of the monomeric materials and the polymeric materials which are interpolymerized to provide a fiber-forming composition containing between about 5 and 17 percent by weight of the dissolved or dispersed polymeric substance which is produced, based on the total weight of the composition.

The aqueous, polyacrylonitrile-solvent, saline solutions, which are ubiquitously employed in the practice of the present invention for dissolving the monomeric and sometimes the polymeric materials or for forming the monomer-containing dissolving solution for the polymeric materials and as vehicles for their polymerization and also as the dispersing or dissolving media in the fiber-forming compositions which may be obtained, may advantageously be the known and commonly employed saline solutions and compositions which are useful as both the polymerization media and as the spinning solution solvents for various polymers and copolymers of acrylonitrile containing predominant proportions of acrylonitrile in the polymer molecules. Ordinarily they are concentrated aqueous solutions of salts or mixtures of salts which, for example, may be prepared to contain at least about 55 percent by weight, based on the weight of solution, of zinc chloride and the like. They also may be mixtures of salts prepared according to the disclosure contained in U.S. Patent No. 2,648,647 issued on August 11, 1953, to George W. Stanton, Theodore B. Lefferdink, and Clyde W. Davis. A polyacrylonitrile-solvent solution comprised of about 60 parts by weight of zinc chloride in about 40 parts by weight of water may be utilized with especial advantage.

The polymerization of the monoethylenically unsaturated monomeric material in the presence of the dissolved functional polymeric material to form the graft copolymer-containing polymeric substance may be effected according to various conventional techniques as may be suitable in particular instances. While the polymerized product may frequently be soluble without gel formation or other undesirable characteristics in the saline solutions which are employed, the excrescence of certain monomeric materials during their interpolymerization as a chemically attached chain to certain polymeric materials may yield a graft copolymer in the polymerized product which is not completely soluble in the saline solution. However, even with such an occurrence in the compositions which are prepared according to the method of the present invention, the polymeric substance product is discretely obtained as an extremely fine and uniform dispersion throughout the composition which generally does not interfere with its spinnability through ordinary orifices or with the fiber-forming characteristics of the system. Compositions having such relatively insoluble fractions may usually be utilized in a conventional manner to prepare high quality fibers and the like in which desired properties have been improved by incorporation of the functional ingredients.

The fiber-forming systems of the present invention may be spun most conveniently into fibers and the like according to procedures and techniques which are commonly practiced with fiber-forming compositions that are comprised of the utilized saline solutions. Thus, by way of illustration, they may be coagulated in more dilute saline solutions of a like or similar nature and may then be processed after coagulation according to conventional techniques of washing, stretching, drying, finishing, and the like. If it is desired or preferred, however, other methods which may be suitable for spinning or extruding such compositions into fibers and related articles may also be employed or, as indicated, the articles may be cast or otherwise formed into desired shaped articles.

The invention is further illustrated in and by the following examples in which, unless otherwise indicated, all parts and percentages are to be taken by weight.

EXAMPLE I

About 450 parts of acrylonitrile was dissolved with about 50 parts of polyvinylpyrrolidone in about 3,500 parts of a 60 percent aqueous solution of zinc chloride to form a polymerization system which contained, as a catalyst, about 18 parts of a 5 percent solution of hydrogen peroxide in water. The polyvinylpyrrolidone which was employed had a Fikentscher K value of about 30. The mixture was polymerized with high product yield at a temperature of about 50° C. for a period of time of about 16 hours. During the polymerization, very fine particles of a graft copolymer were precipitated and dispersed throughout the saline medium. The resulting dispersion-containing system was wet-spun into fibers according to a conventional technique.

The foregoing procedure, which for convenience is referred to as run "A," was twice repeated in an identical manner excepting the proportions of polyvinylpyrrolidone were varied. These runs are referred to as "B" and "C." In each case, the resultant fibers had excellent physical properties, as indicated in the following table. They were readily dyeable to deep, level shades with such dyestuffs as Calcodur Pink 2 BL, Amacel Scarlet BS, Calcocid Alizarine Violet and Xylene Milling Black. Their dyeability, as represented by the numerical reflectance values in the table, is indicative of the extent to which they were dyed by Calcodur Pink 2 BL. The values were obtained from 0.5 gram samples of the fiber after dyeing them at the boil in a solution containing about 0.020 gram of the dyestuff and about 0.075 gram of sodium sulfate in about 15 milliliters of distilled water. The dyed samples, after being rinsed with water, dried for about 20 minutes at about 80° C., and carded were placed in a Beckman Spectrophotometer. The spectrophotometer was employed to measure the amount of light from a standard source which was reflected from the dyed samples. The numerical reflectance value given represents a relative comparison of the amount of light which was reflected from each of the dyed samples with that reflected from a standard white tile reflector, having an arbitrarily assigned reflectance value of 100. Lower reflectance values are an indication of better dye-receptivity in the fiber.

*Table I*

| Run | "A" | "B" | "C" |
| --- | --- | --- | --- |
| Percent polyvinylpyrrolidone employed in polymerization system | 10 | 11 | 12 |
| Percent yield of polymerized product | 99.8 | 97.9 | 99.4 |
| Percent polyvinylpyrrolidone in fiber product | 8.4 | 10.9 | 9.9 |
| Denier of Spun Fiber | 3.1 | 4.0 | 3.1 |
| Fiber tenacity, grams/denier | 4.3 | 2.2 | 3.8 |
| Fiber elongation, percent | 24 | 31 | 23 |
| Yield point of fiber, grams/denier | 0.9 | 0.7 | 0.8 |
| Reflectance Value | 18 | 13 | 13 |

By way of contrast, two additional runs (referred to as "D" and "E") were performed in a manner not according to the practice of the present invention. In each of the additional runs, polymer blend spinning solutions were prepared by mixing polyvinylpyrrolidone, having a Fikentscher K value of about 30, which was dispersed in 60 percent aqueous zinc chloride solution, with a dissolved polyacrylonitrile solution. A 6.8 percent polyvinylpyrrolidone dispersion was obtained in run "D" by ball milling the polymer for about 72 hours in the aqueous zinc chloride solution. A 9.9 percent polyvinylpyrrolidone dispersion was obtained in run "E" by ball milling the polymer for about 71 hours in the solution. Each of the blended spinning dispersions were conventionally wet spun into fibers which were tested for physical properties and dye-receptivity. In both of the runs the resulting fibers had generally less desirable characteristics than those obtained in runs "A," "B" and "C." In addition, the retention of the functional polyvinylpyrrolidone was poor in the polymer blend fibers. This may be observed by comparison of the data in the following Table II, which includes details on the compositions of the spinning solutions, with that of Table I.

*Table II*

| Run | "D" | "E" |
| --- | --- | --- |
| Percent polyvinylpyrrolidone in blended polymer solids | 10.1 | 10.0 |
| Percent polymer solids in blended spinning solution | 9.7 | 10.2 |
| Percent polyvinylpyrrolidone in fiber product | 1.0 | 4.0 |
| Denier of Spun Fiber | 3.7 | 2.9 |
| Fiber tenacity, grams/denier | 3.7 | 4.1 |
| Fiber elongation, percent | 32 | 32 |
| Yield point of fiber, grams/denier | 1.01 | 1.01 |
| Reflectance value | 100 | 70 |

EXAMPLE II

About 10.8 grams of a commercially available polyvinyl alcohol (obtained as the product under the tradename "Elvanol Type B" and characterized as being Grade 72–51, high viscosity, 98–100 percent hydrolyzed) and 97.6 grams of acrylonitrile were dissolved in about 874.5 grams of a 60 percent aqueous solution of zinc chloride. The monomeric material was polymerized in the presence of the polymeric material at a temperature of about 50° C. for a period of time of about 16 hours with the catalytic assistance of about 4.5 milliliters of a 5 percent solution of hydrogen peroxide in water. About 96.7 percent of the charged materials were converted to the polymerized product. The polymeric substance formed, which included polyacrylonitrile and an acrylonitrile-polyvinyl alcohol graft copolymer, was soluble in the zinc chloride solution as a clear, gel-free, fiber-forming spinning solution. The spinning solution was extruded through a suitable spinnerette in an aqueous zinc chloride coagulating bath and through other conventional processing treatments to obtain fibers of about 3.7 denier. The resultant fibers had a tenacity of about 2.3 grams per denier, an elongation of about 40 percent, and a yield point of about 0.8 gram per denier. They were readily dyed according to common procedures to deep, level shades of coloration with such dyestuffs as Calcodur Pink 2 BL, Amacel Scarlet BS, Calcocid Alizarine Violet and Xylene Milling Black. The fibers which were dyed with Calcodur Pink 2 BL had a numerical reflectance value, obtained according to the procedure set forth in Example I, of about 29.

EXAMPLE III

A copolymer of vinylpyrrolidone and vinyl acetate was prepared by charging a polymerization flask with about 35.0 grams of vinyl pyrrolidone, 15.0 grams of vinyl acetate, 0.25 gram of azobisisobutyronitrile and 50.0 grams of purified benzene. The polymerization was effected by refluxing the charge for a period of about one hour at a temperature maintained in the neighborhood of about 85–90° C. The resulting viscous solution of the copolymer was diluted with about 400 milliliters of benzene and 125 milliliters of methyl ethyl ketone. The diluted solution was then slowly stirred into a five-times-as-large volume of kerosene to coagulate the copolymer which was recovered by filtration. The copolymer was then purified by being redissolved in a solution containing equal parts of benzene and methyl ethyl ketone before being reprecipitated with kerosene. The purified copolymer was washed with hexane and air dried at room temperature after which it was finally dried at a temperature of about 80° C. The copolymer was found to contain about 65 mol percent of vinyl pyrrolidone and 35 mol percent of vinyl acetate polymerized in the polymer molecule.

About 36 grams of the copolymer was dissolved in about 1,600 milliliters of an aqueous 60 percent zinc chloride solution along with about 355 grams of acrylonitrile and about 16 milliliters of 5 percent aqueous hydrogen peroxide. Polymerization of the dissolved materials was carried out for about 16 hours at a temperature of about 50° C. About a 96 percent yield of polymerized product was obtained in a gel-free, spinnable dispersion.

The dispersed polymeric substance, which contained about 10 percent of the functional vinyl pyrrolidone-vinyl acetate copolymer, was wet-spun into 2.7 denier fibers. The fibers were dyeable with excellent results by Amacel Scarlet BS, Calcodur Pink 2 BL, Calcocid Alizarine Violet and Sulfanthrene Red 3B Paste. In each case a washfast coloration was produced. The physical properties of the fiber were found to include a tenacity of about 3.5 grams per denier, an elongation of about 29 percent and a yield point of about 1.0 gram per denier.

Similar fibers which were prepared to contain about 6 percent of the functional copolymer were found to have similar dye-receptivity and analogous physical properties.

EXAMPLE IV

A copolymer containing about equal mol percentages of vinylpyrrolidone and vinyl acetate in the polymer molecule was prepared in a manner which was similar to that which was employed in Example III excepting that about 23.1 grams of vinyl pyrrolidone and 26.9 grams of vinyl acetate were employed in the polymerization charge.

The copolymer was polymerized in different proportions with acrylonitrile in a manner similar to that set forth in Example III in order to prepare graft-copolymer containing fiber-forming solutions which were wet-spun into fibers containing 6, and 10 percent of the functional copolymer. The dye-receptivity, washfastness and other general physical properties and characteristics of each of the thus produced fibers were analogous to the fibers obtained as described in Example III.

EXAMPLE V

In a manner similar to that employed in the preceding examples, fiber-forming systems were prepared with acrylonitrile and such functional polymeric materials as polyethylene glycol having a relatively low molecular weight of about 1200; copolymers of acrylamide and vinylbenzene sulfonic acid containing about 5 percent of vinyl benzene sulfonic acid in the polymer molecule; copolymers of acrylamide and vinylbenzyltrimethyl ammonium chloride containing about 50 percent of acrylamide in the polymer molecule; copolymers of the sodium salt of N-acryloyl taurine and 2-aminoethylmethacrylate hydrochloride; copolymers of vinyl pyrrolidone and maleic anhydride, and copolymers of acrylonitrile and ethylene sulfonic acid. In each case the polymerized product contained polyacrylonitrile and a graft copolymer of acrylonitrile and the functional polymeric material. The fiber-forming compositions which were thereby obtained were spun into fiber products which generally had desirable and enhanced properties.

EXAMPLE VI

Acrylonitrile was polymerized in a 60 percent aqueous zinc chloride spinning solution in the presence of a copolymer of acrylonitrile and ethylene sulfonic acid containing about 82.75 percent of acrylonitrile in the polymer molecule according to the general procedure detailed in the preceding examples. The quantity of the functional copolymer which was employed was, in an analogous manner, calculated to permit fibers to be manufactured containing about 3.0 percent of the ethylene sulfonic acid. The polymerized product contained polyacrylonitrile and a graft copolymer of acrylonitrile with the functional copolymer. Fibers which were wet-spun from the produced fiber-forming system were found to contain about 2.8 percent of the ethylene sulfonic acid.

A contrasting comparison to the foregoing example was obtained by the following experimentation not in accordance with the present invention. A dye-receptive copolymer of acrylonitrile and ethylene sulfonic acid, containing about 82.75 percent of acrylonitrile in the polymer molecule, was dissolved in a spinning solution of polyacrylonitrile in 60 percent aqueous zinc chloride solution. An amount of the copolymer calculated to provide about 3.0 percent of ethylene sulfonic acid in fibers prepared from the spinning solution was employed. The solution of blended polymeric materials was then spun into fibers according to conventional wet spinning techniques. The resulting fibers were found to contain only about 1.6 percent of ethylene sulfonic acid due to leaching of the functional copolymer from the fiber during its coagulation and processing treatment. In a similar manner, a copolymer of acrylonitrile and ethylene sulfonic acid containing only about 68.8 percent of acrylonitrile in the polymer molecule was added to an identical polyacrylonitrile spinning solution in an amount which likewise was calculated to facilitate the procurement of fibers containing about 3.0 percent of the ethylene sulfonic acid. Wet-spun fibers from this polymer blended spinning solution were found to contain only about 1.5 percent of the desired ethylene sulfonic acid.

As would be expected, the fibers obtained from the graft copolymer-containing spinning system prepared according to the present invention and retaining greater relative amounts of the ethylene sulfonic acid exhibited a more enhanced dye-receptivity in comparison to the fibers prepared from the blended polymeric material. Their improvement in this respect was increased with the greater retained amount of ethylene sulfonic acid in the graft copolymer containing fibers.

EXAMPLE VII

About 95.8 parts (4.48 grams) of acrylonitrile was polymerized in the presence of about 4.2 parts (0.196 gram) of a polymeric substance consisting essentially of the homopolymer of the sodium salt of 2-sulfoethylacrylate. The polymerization was conducted for a period of about 16 hours at a temperature of about 50° C. in about 34.9 grams of an aqueous 60 percent zinc chloride solution. About 0.2 gram of 5 percent hydrogen peroxide solution was employed as a catalyst. After the polymerization was terminated, the graft copolymer-containing system was cast into films which were thoroughly washed with water to be free from zinc chloride before being dried and weighed. The amount of solids which were recovered in this manner indicated that an essentially complete polymerization had occurred. The films, upon analysis, were found to contain about 0.52 percent of sulfur which showed that the interpolymerized product contained about 3.3 percent of the sodium salt of 2-sulfoethylacrylate polymerized therein.

For purposes of contrast, about 0.098 gram (4.2 parts) of the same homopolymer of the sodium salt of 2-sulfoethylacrylate was blended in about a 10.2 percent solution of about 2.24 grams (95.8 parts) of polyacrylonitrile in about 19.71 grams of aqueous 60 percent zinc chloride solution. Films were cast from this physical mixture of the individual polymers and washed with water until they were substantially free from zinc chloride. They were found to contain only about 0.23 percent sulfur, indicating that the cast film comprised of the polymer blend contained only about 1.45 percent of the homopolymerized sodium salt of 2-sulfoethylacrylate and that a substantial portion of the water soluble homopolymer had been leached from the films during their washing.

EXAMPLE VIII

The procedure of Example VII was repeated identically excepting that a homopolymer of the sodium salt of X-sulfopropylacrylate was employed in the place of the polymerized sodium salt of 2-sulfoethylacrylate. About 95.8 percent solids were recovered from the reacted ingredients in the graft copolymer-containing system. Washed films cast from the graft copolymer-containing system were found to contain about 0.38 percent of sulfur to indicate a content of about 2.6 percent of the interpolymerized sodium-X-sulfopropylacrylate polymer. Washed films comprised of a polymer blend of the polymeric materials had a sulfur content and corresponding poly-X-sulfopropylacrylate content of only about 0.13 and 0.88 percent, respectively.

EXAMPLE IX

About 22.4 grams of acrylonitrile and 1.05 grams of the sodium salt of 2-sulfoethylacrylate were polymerized in the presence of about 2.4 grams of polyvinylpyrrolidone (having a Fikentscher K value of about 30) in about 174.7 grams of an aqueous 60 percent zinc chloride solution which contained about 1.0 gram of 5 percent hydrogen peroxide. A weight ratio of 86.6:4.1:9.3 was employed for the acrylonitrile, sodium-2-sulfoethylacrylate and polyvinylpyrrolidone, respectively. The polymerization was conducted at a temperature of about 50° C. and was terminated at the end of about a 16 hour period. Fibers which were spun directly from the product graft copolymer-containing solution had very excellent dyeability with direct, acetate, basic, acid and vat dyes due to the interpolymerized presence of both the functional monomeric substance and the functional polymeric material.

EXAMPLE X

In a like manner, results which are analogous to those of the first nine examples may be obtained according to the general procedure outlined therein when mixtures containing predominant proportions of acrylonitrile with such monomeric materials as vinyl acetate; methyl acrylate; 2-vinyl pyridine; dimethylaminoethylacrylate; methacrylonitrile; methyl acrylamide; acrylic acid; and ethyl acrylate are polymerized in the presence of the polymeric materials mentioned throughout the examples, particularly when such polymeric materials as polyvinylpyrrolidone, polyvinyl alcohol and copolymers of ethylene sulfonic acid are employed.

The salutary advantages and benefits which may be obtained by preparing the graft copolymer directly in the fiber-forming system according to the method of the present invention may be brought into sharper focus by comparison of the results obtained in the preceding examples with the difficulties which are encountered when it is attempted to utilize separately prepared graft copolymers in aqueous, polyacrylonitrile-solvent saline solutions after a fashion of practice which is not within the scope of the invention. Each of three varying graft copolymers of acrylonitrile, hereinafter referred to as samples "F," "G" and "H," were prepared in a manner suggested by the teachings to be found in the twenty-first example of Australian patent application No. 7576/52. According to the therein-suggested procedure, a solution of about 20 grams of magnesium sulfate in about 55 milliliters of 0.05 percent sulfuric acid is added to polyvinylpyrrolidone dissolved in about 60 milliliters of water. The dissolved mixture is heated to about 45° C. after which about 0.2 gram of ammonium persulfate and 0.4 gram of sodium bisulfite are added to catalyze the polymerization. Acrylonitrile is added to the mixture which is heated under autogenous pressure at a temperature of about 52° C. for about 16 hours. The precipitated graft copolymer may then be separated from the polymerization medium for subsequent use. The differences between the three graft copolymers which were prepared accordingly may be discerned in the following table.

*Table III*

| Graft Copolymer Sample [1] | "F" | "G" | "H" |
|---|---|---|---|
| Wt. acrylonitrile employed, grams | 16.0 | 11.5 | 18.2 |
| Wt. polyvinylpyrrolidone employed, grams | 4.5 | 9.0 | 2.3 |
| Wt. of total charge, grams | 20.5 | 20.5 | 20.5 |
| Polymerized product recovered, grams | 17.7 | 14.5 | 19.1 |

[1] Note—This sample was prepared by repeating exactly the twenty-first example of Australian Patent Application No. 7576/52.

None of the graft copolymers "F," "G," or "H" were soluble in 60 percent aqueous zinc chloride solutions nor did they form spinnable fiber-forming dispersions with such a saline solution. In addition, attempts were made to prepare analogous graft copolymers by the same procedure excepting to substitute a like zinc chloride solution for the magnesium sulfate solution. Completely negative results were obtained in the experimentation.

As is apparent, the present invention provides improved graft copolymer-containing fiber-forming systems and compositions in a simple, forthright and expedient manner which facilitates the manufacture of fibers and similar shaped articles having superior and otherwise unobtainable properties and characteristics. It secures to a markedly greater extent the advantages which may be realized by employing functional ingredients in fiber-forming compositions without involving or introducing the difficulties which commonly are encountered in such practice. It eliminates the necessity for the tedious separate preparation of graft copolymer-containing fiber-forming polymeric substances for subsequent utilization in spinnable compositions. It also eliminates the frequently painstaking and complex task of incorporating such separately prepared polymeric substances in spinnable compositions. Furthermore, particularly when wet-spinning techniques are employed, it permits the substantially complete retention in fibers and related articles of many functional ingredients which are frequently leachable or otherwise separable when they are included in the fibers and fiber-forming compositions in ways not in accordance with the invention. Such advantages and benefits in the employment of many functional ingredients are not ordinarily obtainable when it is attempted to utilize them according to other techniques.

Since certain modifications and changes can readily be entered into in the practice of the present invention without substantially departing from its intended spirit and scope, it is to be fully understood that all the foregoing description and specification be interpreted and construed as being merely illustrative of certain of the preferred embodiments of the invention and in no sense or manner is such description to be taken as being limiting or restrictive of the invention excepting as it is set forth and defined in the appended claims.

What is claimed is:

1. Method of forming wet spun shaped articles which method consists of the steps of (1) dissolving, in an aqueous saline solution that is a solvent for polyacrylonitrile, (a) a monoethylenically unsaturated monomeric material comprised of at least a predominant proportion of acrylonitrile, any balance being another monoethylenically unsaturated monomeric material that is copolymerizable with acrylonitrile and (b) polyvinyl pyrrolidone; (2) polymerizing the dissolved monomeric material in the presence of the dissolved polyvinyl pyrrolidone to form a fiber-forming graft copolymer-containing polymeric substance in spinnable dispersion in said aqueous, polyacrylonitrile-dissolving, saline solution; then (3) extruding said fiber-forming polymeric substance in spinnable dispersion into a shaped article in a coagulating liquid for said spinnable dispersion.

2. The method of claim 1 wherein the monoethylenically unsaturated monomeric material comprises acrylonitrile which is employed in a sufficient quantity to obtain a resulting polymerized substance, including the graft copolymer which is formed, which contains at least about 80 percent by weight of acrylonitrile that is polymerized in the polymerized substance.

References Cited in the file of this patent

UNITED STATES PATENTS

| 2,140,921 | Rein | Dec. 20, 1938 |
| 2,425,192 | Kropa | Aug. 5, 1947 |

FOREIGN PATENTS

| 1,054,343 | France | Oct. 7, 1953 |